United States Patent [19]

Rowland

[11] 4,279,471
[45] Jul. 21, 1981

[54] RETROREFLECTOR FOR ROAD SURFACES

[75] Inventor: William P. Rowland, Southington, Conn.

[73] Assignee: Reflexite Corporation, New Britain, Conn.

[21] Appl. No.: 108,662

[22] Filed: Dec. 31, 1979

[51] Int. Cl.³ .............................................. G02B 5/124
[52] U.S. Cl. ...................................... 350/103; 350/97; 404/6
[58] Field of Search .......................... 404/17, 6, 9, 14; 350/101–109

[56] References Cited

U.S. PATENT DOCUMENTS

| | | | |
|---|---|---|---|
| 2,851,935 | 9/1958 | Weeks | 404/13 |
| 2,991,698 | 7/1961 | Leubaz | 350/97 |
| 3,343,467 | 9/1967 | Bonvallet | 94/1.5 |
| 3,519,327 | 7/1970 | Nakajima | 350/97 |
| 3,785,719 | 1/1974 | Jonnes | 350/105 |
| 3,830,682 | 8/1974 | Rowland | 350/109 |
| 3,836,226 | 9/1974 | Cechetini | 350/103 |
| 3,889,027 | 6/1975 | White | 350/109 |
| 3,894,791 | 7/1975 | Eigenmann | 404/14 |
| 3,920,346 | 11/1976 | Wyckoff | 404/14 |
| 3,971,623 | 7/1976 | Hedgewick et al. | 404/11 |
| 4,035,059 | 7/1977 | De Master | 350/97 |
| 4,070,095 | 1/1978 | Suhr | 350/103 |
| 4,129,397 | 12/1978 | Eigenmann | 404/14 |
| 4,145,112 | 3/1979 | Crone | 350/103 |

Primary Examiner—John K. Corbin
Assistant Examiner—B. W. de los Reyes

[57] ABSTRACT

A retroreflective assembly includes a transparent polycarbonate housing of generally trapezoidal cross section. A channel extends upwardly from the base of the trapezoid, and the channel receives a vertically oriented strip of retroreflective sheet material. Planar side surfaces are provided at an angle with the vertical so that light from oncoming cars impinging on it will be directed downward to the retroreflective strip, whose top is spaced downward from the top of the housing to permit a thickness of material between the top of the channel on the top of the housing that is sufficient to afford structural strength to the housing. As a result, the image of the retroreflective strip is higher than its actual position, permitting relatively high visibility in a small structure of rugged construction.

1 Claim, 7 Drawing Figures

RETROREFLECTOR FOR ROAD SURFACES

BACKGROUND OF THE INVENTION

The present invention is related to retroreflective devices, particularly those of the type employed on roadways.

Retroreflective devices have been used for some time in marking roadways and in providing similar marking functions. Typically, the retroreflectors are used outdoors in a wide variety of environmental conditions, and in some applications they are used in large numbers. In addition, those used on roadways are often subjected to repeated impact from passing traffic. Accordingly, low cost and durability are among the criteria for determining whether or not a given retroreflective device is to be used. It is also desirable that the device be simple to manufacture, easy to use, and readily replaceable. All of these features should be provided in a structure that is highly visible to someone in an oncoming vehicle regardless of weather conditions. Since roadway reflectors must stand up to the impact of passing traffic, it is also desirable for the retroreflector to present a low profile. Of course, the requirement of high visibility and the presentation of a low profile are conflicting to an extent, so it is important to effect the best tradeoff possible between these two requirements.

Although the number of types of retroreflective devices precludes an exhaustive listing here, an exemplary type is illustrated generally in U.S. Pat. No. 3,519,327 to Nakajima. In this type of retroreflective device, a reflecting surface is provided by an interior block that is covered by refractive material. In the device specifically described in the Nakajima reference, the retroreflective structure is provided by a vertical surface on the block. The surface is made up of a series of vertical planes that intersect at right angles. This vertical surface cooperates with a horizontal reflecting surface to provide the desired retroreflection. It is apparent that such a device is somewhat elaborate. Although it could conceivably be used in quantity, it is likely that the attendant cost would be high.

An attempt to meet the need for a low-profile retroreflective device is illustrated in U.S. Pat. No. 4,145,112 to Crone, in which the retroreflective surface is disposed horizontally in a strip to be applied to the roadway. The substantially horizontally traveling light rays are diverted to the retroreflective surface by the provision of transparent ridges above the retroreflective surface whose faces are at such an angle as to reflect light down to the retroreflective surface. Unfortunately, this type of an arrangement requires a rather large amount of retroreflective surface for a given amount of image. Furthermore, as the teachings of the present invention will show, simpler devices are possible.

U.S. Pat. Nos. 3,920,346 to Wyckoff and 4,129,397 to Eigenmann avoid the problems presented by horizontal retroreflective surfaces. Both arrangements disclose vertically oriented retroreflective surfaces, so the amount of retroreflective surface required for given image is not as great as the amount required by the Crone device. The arrangements illustrated in FIGS. 1-3 of the Eigenmann reference describe a relatively simple device in which a retroreflective insert is received in a groove in a refractive body. Although simple, this arrangement leaves the retroreflective surface generally unprotected, and the groove is thought to make the refractive body somewhat weak structurally. Wyckoff, on the other hand, does appear to provide some kind of covering for the vertical retroreflective piece; moreover, the vertical piece appears to have been provided in the form of a relatively thin strip, which has obvious advantages in simplicity and ease of construction. Again, however, the cavity provided for the sheet material would appear to significantly weaken the surrounding transparent structure because the sealing coating above the sheet material is quite thin. Also, a coating that is too thin is likely to be worn away enough so that foreign matter can find its way onto the retroreflecting surfaces and thus reduce visibility.

It is for the purpose of reducing some of the drawbacks of prior-art retroreflectors that the retroreflective device of the present invention has been developed. It is an object of the present invention to permit a relatively low profile in a device that is highly visible. It is a further object of the present invention to afford these advantages in a structure that is easy to manufacture, simple to install, and rugged.

SUMMARY OF THE INVENTION

The foregoing and related objects are achieved in a retroreflective assembly for mounting on roadways and the like that includes an elongated housing of substantially transparent material. The housing has a base surface, a top surface, and side surfaces extending along its length. The base surface defines a base plane upon which the housing may be supported, and the housing has a channel extending perpendicularly upward from the base surface and terminating at a point spaced from the top surface by a predetermined distance. At least one of the side surfaces of the housing has a longitudinally extending planar light-reception surface portion lying in a plane that intersects an imaginary line extension of the channel at a point spaced above the top surface and at a predetermined acute angle.

An elongated strip of retroreflective sheet material is snugly seated in the channel with a retroflective face disposed towards the planar surface portion of the housing. The retroreflective sheet material has retroreflective formations of cube-corner configuration spaced from the retroreflective face. The predetermined spacing of the channel from the top surface is at least 0.020 inch, the distance between the base surface and the top surface is less than 0.30 inch, and the predetermined acute angle is at least 8°. The refractive index of the synthetic resin of the housing cooperates with the acute angle to cause light rays impinging on the planar surface portion to be refracted downwardly onto the retroreflective face of the strip and reflected therefrom outwardly through the planar portions in a direction substantially parallel to that of incidence thereon. The apparent position of the strip from a viewpoint of less than 8° above the plane of the base is thereby higher than the actual position of the strip.

Preferably, the predetermined acute angle and the refractive index cooperate to cause light striking the light-receiving surface from a path parallel to the base and being directed downward to the upper end of the retroreflective face of the strip to be reflected back through the light-receiving surface at a point spaced above the level of the upper end of the channel by at least a quarter of the predetermined spacing of the channel from the top surface.

The acute angle may be between about 15° and about 35°, and the predetermined spacing of the channel from the top surface is between about 0.020 inch and about 0.060 inch.

In the preferred embodiment, the housing consists essentially of polycarbonate. In view of stability considerations, the width of the base should bear a ratio to the distance between the base surface and the top surface that is at least 1.5 but normally less than about 4.0. The distance between the base surface and the top surface is less than 0.20 inch.

In the preferred embodiment, a second of the side surfaces of the housing has a second longitudinally extending planar light-reception surface portion lying in a plane that intersects the imaginary line extension of the channel at a second point spaced above the top surface and at a second predetermined acute angle. The strip of retroreflective sheet material has a second retroreflective face disposed toward the second light-reception surface, and the retroreflective sheet material has a second set of retroreflective formations of cube-corner configuration spaced from the second retroreflective face. The second predetermined acute angle is at least 8°, and the refractive index of the housing material cooperates with the second acute angle to cause light rays impinging on the second planar light-reception surface portion to be refracted downwardly onto the second retroreflective face of the strip and reflected therefrom outwardly through the second planar light-reception portion in a direction substantially parallel to that of incidence thereon.

The channel is typically disposed substantially centrally of the base portion, and the angles formed by the planes of the first and second planar light-reception surfaces with the imaginary line extension of the channel are equal.

Preferably, the retroreflective strip consists essentially of polycarbonate.

The housing may provide an opaque upper surface, the retroreflective strip thereby being protected from sunlight impinging on the housing from above.

BRIEF DESCRIPTION OF THE DRAWINGS

These and further features and advantages of the present invention are described in connection with the accompanying drawings, in which.

DETAILED DESCRIPTION OF THE PREFERRED EMBODIMENT

Figure 1:
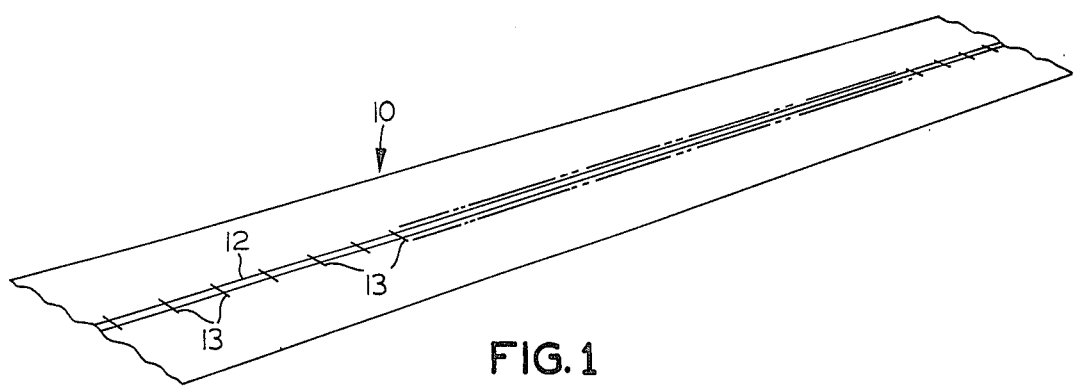
FIG. 1 is a simplified view of a roadway marked by the retroreflective assemblies of the present invention.
Figure 2:
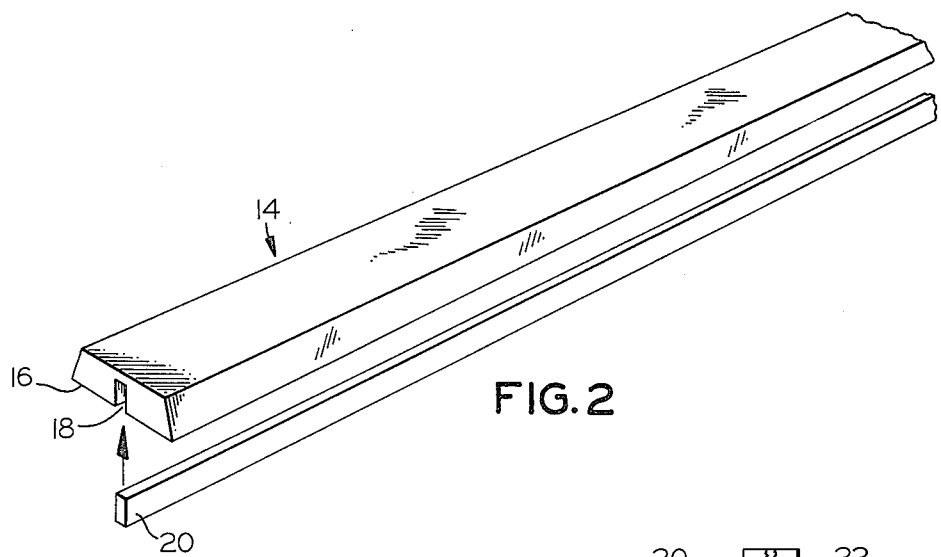
FIG. 2 is a perspective view of a retroreflective assembly according to the present invention showing the retroreflective sheet material before it is inserted into the housing.

FIG. 1 illustrates a roadway, indicated generally by reference numeral 10, on which retroreflective assemblies 13 according to the present invention are disposed on a center line or road edge 12. Each assembly 13 includes a housing 14, as shown in FIG. 2, that is generally trapezoidal in cross section and provides a base 16 from which a channel 18 extends upward and generally perpendicularly to the plane of base 16. A strip of retroreflective sheet material 20 is shown separated from housing 14. In use, the sheet material 20 fits snugly in channel 18.

For ease of description, FIG. 2 is shown with the channel extending all the way through the end of housing 14. This would be the typical arrangement in an extruded version of the device, which would be manufactured by extruding relatively long pieces and then cutting the long extruded pieces to the desired lengths. However, housings of the present invention have been manufactured successfully by injection molding, and end walls have been provided for the channel in the injection-molded version. This provides retroreflective strip 20 with an extra degree of protection from the elements.

Figure 3:
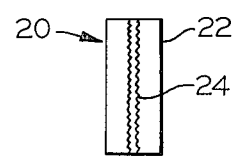
FIG. 3 is an end view of the strip of sheet material used in the device of FIGS. 1 and 2.
Figure 5:
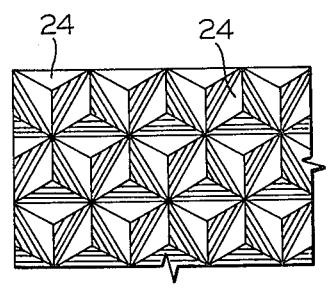
FIG. 5 is an enlarged view of the cube-corner formations provided by sheet material of strip 20.

Retroreflective strip 20, as seen in end view in FIG. 3, is typically made of back-to-back strip portions each of which is provided with cube-corner formations 24. Each strip portion has a planar front surface 22 for receiving light and a rear surface with cube-corner formations 24. In the preferred embodiment, the back-to-back cube-corner formations are vacuum metallized to insure reflection. As those skilled in the art will appreciate, however, the metallizing is not necessary if provision is made to protect the cube-corner surfaces from contamination by foreign matter. The cube-corner formations may be of the type shown in FIG. 5, in which the cube-corner formations are formed of mutually perpendicular triangular faces. Those skilled in the art will recognize that this type of an arrangement causes light impinging upon surface 22 to be reflected in a path parallel to that of the incident light.

In the preferred embodiment, retroreflective strip 20 is conveniently formed of sheet material of the type described in the copending U.S. patent application of William P. Rowland for Method and Apparatus For Compression Molding of Retroreflective now U.S. Pat. No. 4,244,683 Sheeting and Sheeting Produced Thereby. The sheet material provides cube-corner formations whose center-to-center spacing is approximately 0.006 inch (0.015 cm.). This small spacing between cube-corner centers is particularly advantageous in the present arrangement, in which the height of the retroreflective strip is only 0.040 inch (0.10 cm.). Manufacture of such small strips of sheet material typically includes slicing a sheet of the material into strips, a process that can cut into some of the retroreflective elements and thus deprive them of their retroreflective properties. If the elements were large, a significant portion of the strip area at its top and bottom could be rendered ineffective. Accordingly, the small spacing achieved in the sheet material described in the above-mentioned application is used to particular advantage in the present invention. Furthermore, the use of flexible sheet material contributes to simplicity of construction. The double-faced sheet material of the preferred embodiment has a thickness of only 0.027 inch (0.069 cm.), and it has been found that such a strip can easily be fitted snugly into a channel. Thus, the use of sheet material of this type is recommended.

Figure 4:
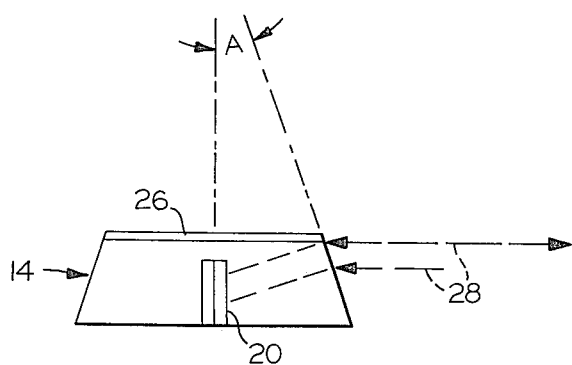
FIG. 4 is an end view of an assembly similar to FIG. 2 in which the upper end of the housing is molded or extruded from an opaque material.

FIG. 4 shows the way in which the arrangement of the present invention permits a low profile to be presented while at the same time providing structual strength and as great an amount of visibility as is possible. Housing 14 is shown to have a planar side surface provided at an angle A with the plane of the retroreflective strip 20. Housing 14 is made of polycarbonate, a tough transparent plastic, so light impinging on the side surface of housing 14 travels through it to retroreflective strip 20. The angle A and the index of refraction of polycarbonate (1.59) cooperate to direct the light impinging on the side surface down to retroreflective strip 20. Given the index of refraction of the polycarbonate, the spacing of the channel 18 from the side surface and the angle A are selected so that the upper edge of surface 22 of the retroreflective strip receives light that impinges on the side surface at a predetermined position above the level of the top of strip 20 from a path parallel to base 16. This light is then reflected in approximately the same path, and the effect therefore is that the image of the retroreflective strip 20 is higher than the actual position of the retroreflective strip. As a result, the image of strip 20 can be relatively high, increasing visibility, despite the fact that strip 20 is located low enough so that a significant amount of housing material can be provided above the channel. This arrangement provides the housing with structural strength and accommodates the wearing away that passing traffic can cause.

From the preceding description it is apparent that the housing should be essentially transparent; i.e., it may be colored or clear, but it should not diffuse light to the extent that no discernible image of the reflector remains. Nonetheless, it is expected that most versions of the housing will introduce some distortion, and some distortion is acceptable.

It will be appreciated that appropriate spacing of the channel and angling of the side plane would result in the image of the retroreflective strip being provided at the very upper edge of the side plane of the housing, and this would provide an image that is as high as possible with a given housing height. However, it is thought that most users of the device will find it preferable to space the top of the image down slightly from the top edge of the planar side surface of the housing. This is because wear is likely to occur at the very edge, thus disrupting the light path and eliminating the effect of the upper edge of the retroreflective strip 20. Accordingly, a typical design will cause the top of the image produced by light rays in an air path parallel to the base of housing 14 to be spaced somewhat downward from the upper edge of the light-receiving plane. In the preferred embodiment, the overall height of the housing is 0.10 inch (0.25 cm.). The height of strip 20, on the other hand, is approximately 0.06 inch (0.15 cm.). As a result, the projection of the strip on the planar side surface of the housing 14, which is only slightly greater than the height of the strip, is spaced approximately 0.02 inch (0.05 cm.) from the upper edge of the planar surface and by about the same distance from its lower edge. This means that the image of the strip is at a position higher than that of the actual strip, but the top of the image is not as high as the top of the planar surface. Specifically, the image of the strip is raised by about half of the distance from the top of the strip to the top surface of the housing. This specific positioning of the image is not required, of course, but it is thought that raising the image by at least a quarter of the distance from the top of the strip to the top housing surface will be desired in order to obtain the visibility advantages afforded by the invention.

Of course, the dimensions given here are merely exemplary. It is preferable for the height of the housing to be less than about 0.20 inch (0.51 cm.) Visibility requirements of some road conditions, however, may dictate a height as great as 0.30 inch (0.76 cm.).

The angle A shown in the drawing is approximately 25°. It is thought that it will be desirable to provide an angle of at least 8° so as to afford the beneficial effects of the present invention as vehicles approach the reflector at a relatively short distance. As those skilled in the art will appreciate in view of the teachings of the present invention, the refraction upon which the present invention depends is only provided if the air path taken by the light is lower than a path perpendicular to the light-receiving plane; when the light impinges perpendicularly upon the light-receiving surface at an angle perpendicular to it, no refraction occurs. The choice of angle will be dictated to some extent by the index of refraction of the housing material and the spacing of the channel from the light-reception surface. But too low an angle will necessitate too great a spacing between channel 18 and the light-receiving surface, and too great an angle could result in an undesirably large expanse of light-receiving surface. A good tradeoff among these factors is thought to lie in the range between about 15° and about 35°.

It is noted that the portion of housing 14 between the top of the channel and the top of the housing provides a "bridge" that is probably the weakest point in the housing from a structural point of view. It is desirable to keep this bridge relatively thick, and this is why the structure is arranged so that the image of the strip is higher than the actual strip; the strip is kept low to permit substantial bridge thickness, but the image is kept high to enhance visibility. In the preferred embodiment, the bridge thickness is about 0.04 inch (about 0.10 cm.). Although it is throught that a bridge thickness of around 0.020 inch (0.05 cm.) would prove sufficient for the structural strength, the extra thickness is provided so that the bridge thickness will remain adequate after a significant amount of wear has occurred. Further thickness of the bridge, of course, would accommodate more wear, but it is thought that the extra height in profile is not justified by the marginal increase in strength beyond a bridge thickness of 0.060 inch (0.15 cm.). Of course, these figures depend somewhat on the housing material, the figures just mentioned being based on polycarbonate. Glass could also be used for the housing, and many tough plastics could be employed, too. Examples are polyurethane, high-density polyethylene, rubber-modified acrylic, rubber-modified polystyrene and styrene copolymers, and rubber-modified nitrile copolymers, and the desired bridge thicknesses would vary accordingly.

In the preferred embodiment, the width of the base is approximately 0.25 inch (0.64 cm.). This width is chosen to some extent based on the need to space the channel from the light-receiving plane so that enough refraction distance is provided. But the stability of the assembly on the road surface is also a factor; it is thought that the width of the base should be at least half again the height of the housing to provide the necessary stability. In the preferred embodiment, the width of the housing is 2.5 times its height. Presumably, the stability could be increased by increasing the width of the housing, but increases in base-to-height ratio over about 4.0 are not thought to significantly increase the stability of the structure.

In FIG. 4, the housing is illustrated as having an opaque upper layer 26, which could be provided, for instance, by two-color molding. The purpose of the opaque upper surface is to shade the retroreflective strip from the sun and thereby reduce ultraviolet-light-induced deterioration. FIG. 4 shows the opaque layer extending down as far as the image of the retroreflective strip. This arrangement is possible because the uppermost portion of the light-receiving surface is not used when the light rays approach the reflector from a path nearly parallel to the base. However, it will be found desirable in most cases to provide a somewhat thinner opaque portion because the light angle becomes steeper as the automobile approaches the device. Thus, although the image of the reflector is below the opaque portion from the point of view shown in FIG. 4, part of the image is blocked in the FIG. 4 version when the automobile gets closer and the light path steeper. Accordingly, although the opaque layer in FIG. 4 is acceptable, it would often be made thinner. For instance, the upper surface could be painted with some type of an opaque lacquer to provide ultraviolet-light protection.

It is also to be noted that the image is spaced from the bottom of the side surface to allow for water that may collect at the lower end. This would obscure the image if it were not raised.

The structure shown in FIG. 2 could be applied to the roadway in a number of ways. One way would be to provide a series of the structures transversely of a long tape of the type often used to mark crosswalks in city streets. In this way, a large number of the markers could be applied to the road simultaneously. Since the reflectors are sometimes to be applied with a substantial separation between them, it may be found desirable in some cases to dispense with the long roll of tape and provide two-sided adhesive strips on the bases that are only slightly larger than the base of the reflector. The reflectors with the attached adhesive strips could then be applied individually.

Figure 6:
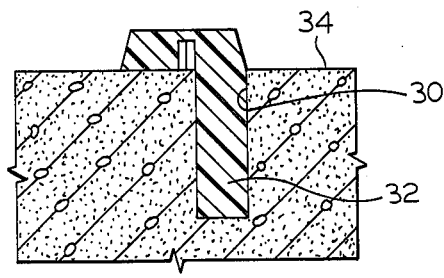
FIG. 6 is a cross section of an embodiment of the present invention in which a tab is provided for reception in a recess in a roadway.
Figure 7:
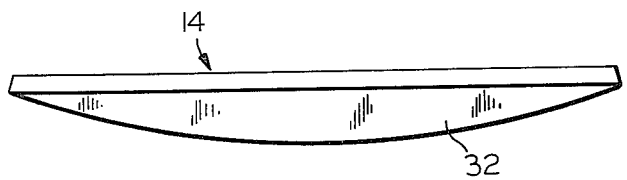
FIG. 7 is a side elevation of the FIG. 6 embodiment.

Another variation is shown in FIGS. 6 and 7, which depict a housing from whose base a tab 32 extends. In extruded versions, the extension of the tab could be made fairly uniform, while it may be found desirable in molded versions to provide the tab with a radius. The tabbed reflector would fit in a slot provided in the roadway by an emery disc, for example. The width of the tab would be approximately equal to the width of the emery disc, while the radius provided on the tab in the molded version could be provided to approximately equal that of the emery disc. Such an arrangement would enhance the stability of the device on the roadway, and it may be found that it will enable the user to dispense with the use of the adhesive.

From the foregoing description, it is apparent that a retroreflective assembly that follows the teachings of the present invention provides an excellent means for satisfying the competing requirements of such devices.

Although it maintains a low profile, it is not necessary that the bridge be so thin as to compromise the structural integrity of the structure. Because of the angled light-reception surface, the light is bent downward to the retroreflective strip so that the image of the strip is raised for the greatest visibility. The housing is simple but provides adequate support for a retroreflector provided in the form of a strip of sheet material. Accordingly, it is thought that the teachings of the present invention will enable those skilled in the art to produce roadway retroreflectors that are low in cost yet provide a significant advance in durability and simplicity.

Having thus described the invention, I claim:

1. A retroreflective assembly for mounting on roadways and the like comprising:
    A. an elongated housing of substantially transparent material having a base surface, a top surface, and side surfaces extending along the length thereof, said base surface defining a base plane upon which said housing may be supported, said housing having a channel extending perpendicularly upward from said base surface and terminating at a point spaced from said top surface by a predetermined distance, at least one of said side surfaces of said housing having a longitudinally extending planar light-reception surface portion lying in a plane that intersects an imaginary line extension of said channel at a point spaced above said top surface and at a predetermined acute angle; and
    B. an elongated strip of retroflective sheet material snugly seated in said channel with a retroflective face disposed towards said planar surface portion of said housing, said retroreflective sheet material having retroreflective formations of cube-corner configuration spaced from said retroreflective face;
    said predetermined spacing of said channel from said top surface being at least 0.020 inch;
    the distance between said base surface and said top surface being less than 0.30 inch;
    said predetermined acute angle being at least 8°, the refractive index of the housing material cooperating with said acute angle to cause light rays impinging on said planar surface portion to be refracted downwardly onto said retroreflective face of said strip and reflected therefrom outwardly through said planar portions in a direction substantially parallel to that of incidence thereon, the apparent position of said strip from a viewpoint of less than 8° above said plane of said base thereby being higher than the actual position of said strip; and
    said housing providing an opaque upper surface, said retroreflective strip thereby being projected from sunlight impinging on said housing from above.

* * * * *